United States Patent [19]
Hanson

[11] 3,821,170

[45] June 28, 1974

[54] ELECTRICAL CONDUCTIVE HEATING OF POLYAMIDE-FORMING CONDENSATION POLYMERS

[75] Inventor: Victor F. Hanson, Yorklyn, Del.

[73] Assignee: E. I. du Pont de Nemours and Company, Wilmington, Del.

[22] Filed: Apr. 10, 1972

[21] Appl. No.: 242,641

[52] U.S. Cl.................................. 260/78 R, 204/72
[51] Int. Cl............................................. C08g 20/24
[58] Field of Search..................... 260/78 R; 204/72

[56] References Cited
UNITED STATES PATENTS

| | | | |
|---|---|---|---|
| 2,988,581 | 6/1961 | Van Berkel | 13/23 |
| 3,349,160 | 10/1967 | Rapson | 13/23 |
| 3,407,179 | 10/1968 | Carr | 260/78 |
| 3,469,012 | 9/1929 | Devaney | 13/23 |
| 3,554,743 | 1/1971 | Maas | 96/1.5 |

Primary Examiner—Lester L. Lee

[57] ABSTRACT

A polymerization process for nylon includes the step of heating an aqueous nylon salt mixture by passing an electrical current through the mixture to generate heat. The electrical resistance of the mixture increases as water boils off and the salt polymerizes.

2 Claims, 2 Drawing Figures

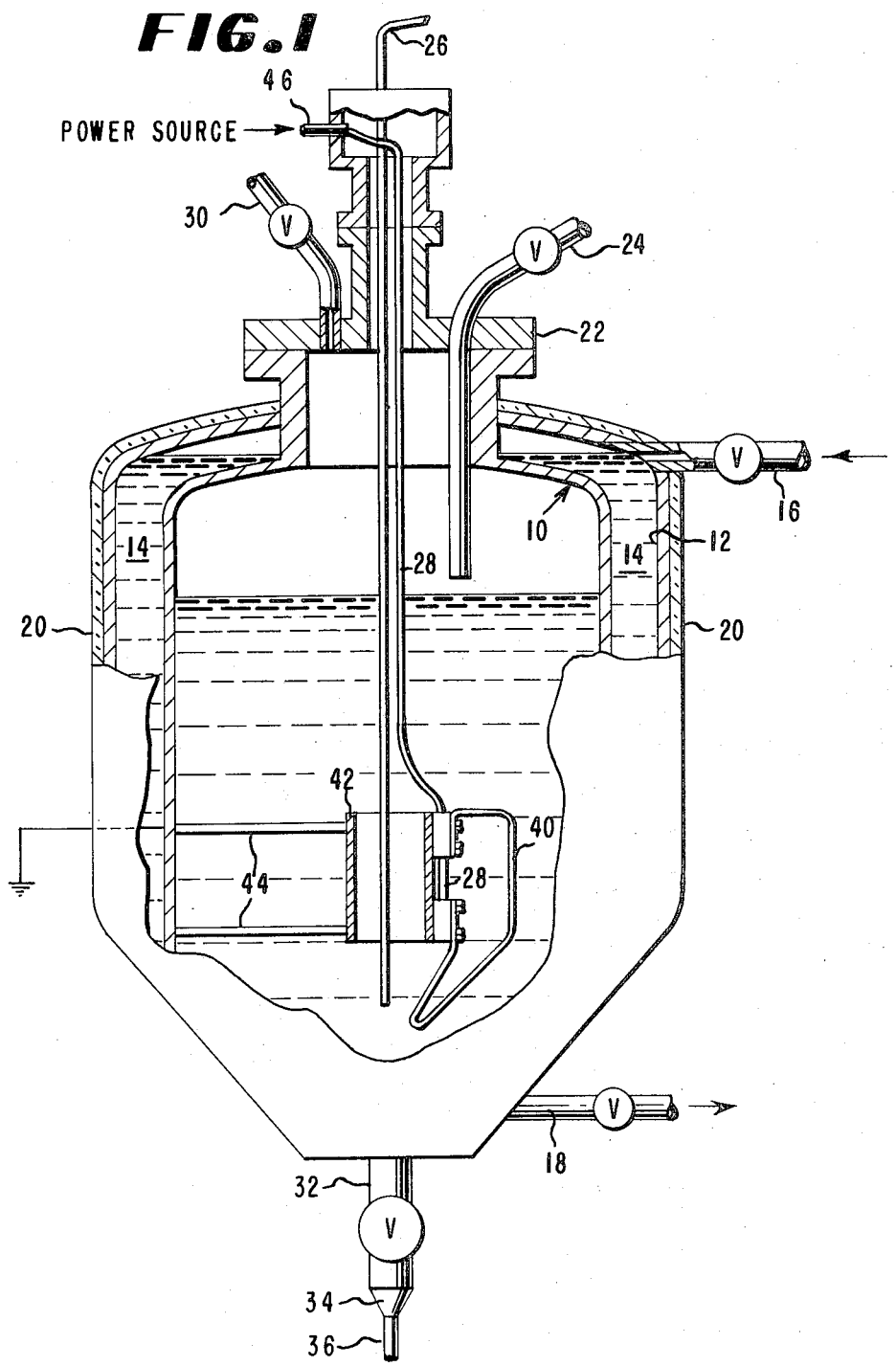
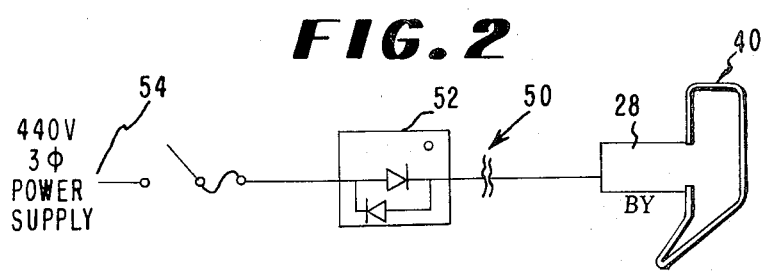

ELECTRICAL CONDUCTIVE HEATING OF POLYAMIDE-FORMING CONDENSATION POLYMERS

BACKGROUND OF THE INVENTION

This invention concerns an improved method for the preparation of synthetic linear fiber-forming, high-molecular weight polyamides from aqueous, polyamide-forming salt reactant mixtures. More specifically, it concerns a novel method for heating such mixtures during polymerization.

A commonly used process for the preparation of polyamides comprises heating an aqueous solution or mixture of the polyamide-forming reactants in a closed system while controlling pressure by venting of water vapor as disclosed, for example, in U.S. Pat. No. 2,163,636 to Spanagel. Normally, the polyamide-forming reactants are salts of a diamine and a dicarboxylic acid as disclosed, for example, in U.S. Pat. No. 2,130,947 to Carothers. In large scale operations, a factor significantly limiting the time required to produce a polymer batch is the rate at which heat can be transferred throughout the aqueous reactant mixture, particularly during the early stages of polymerization which are not reaction-rate limited, where the temperature of the reactants is being increased and the extra water is being removed as steam.

An object of this invention is to reduce the heating time required for the polymerization of polyamides. Another object is to increase the productivity of autoclaves for the batch preparation of polyamides by decreasing the time required to remove the water of solution from the reactants.

SUMMARY OF THE INVENTION

In a process for the preparation of a polyamide from an aqueous mixture of a polyamide-forming salt including the steps of heating said mixture in a closed vessel and venting steam therefrom, the invention comprises the improvement of passing an electrical current through said mixture to generate heat throughout said mixture as a result of its electrical resistance, thus causing the vaporization of water and its removal from the vessel by venting. In a preferred embodiment, such heating is auxiliary to normal heating by heat transfer, e.g., by use of a previously heated (already hot) reactant mixture contained in an autoclave provided with other heating means, at least for the vessel walls.

The term "polyamide-forming salt" refers to salts of diamines and dicarboxylic acid, mixtures thereof, and amino acid salts capable of undergoing condensation polymerization to form high-molecular weight polyamides. The term "aqueous mixture" refers to such salts to which has been added water to form either a solution or a slurry depending upon the solubility and temperature. Examples of such mixtures are more fully described in the above-cited patents.

BRIEF DESCRIPTION OF THE DRAWING

FIG. 1 is a side elevational view, partially sectioned of a batch autoclave into which the improvements of the present invention have been incorporated.

FIG. 2 is a schematic circuit diagram of one phase of an electrical heating circuit employed by the invention.

DETAILED DESCRIPTION OF THE ILLUSTRATED EMBODIMENT

The autoclave embodiment shown in the drawing includes an inner vessel 10 and an outer shell 12 between which a heating fluid 14 is circulated. Fluid 14 is introduced through valved conduit 16 and exits through valved conduit 18. Outer shell 12 is suitably insulated as indicated at 20. The upper open end of vessel 10 is closed by a flanged fitting 22 through which a valved fill conduit 24, a thermowell 26, an insulated electrical cable 28 and a valved vent line 30 pass. The autoclave is also provided with a valved outlet 32 terminating in an extrusion head 34 from which molten polymer issues as a ribbon 36. Three electrodes (one shown) 40 are mounted within shell 10 at 120° to each other around a central support 42 which is attached to shell 10 by support rods 44. Cables 28 are attached at one end to electrodes 40 and at their other end to a power supply via pressure fitting connectors 46.

FIG. 2 is a single phase schematic representation of a three electrode, three phase electrical heating circuit that may be employed for this invention and includes a power controller 52 connected between transformer 50, and the source of power 54. The transformer is in turn connected to electrode 40 via cable 28. The controller 52 is a "Tri-Phaser" SCR type which provides manual control of the power input to the electrode heater 40.

A common batch autoclave process for polymerizing nylon such as poly(hexamethylene adipamide) from the salt of hexamethylene diamine and adipic acid consists of five stages. Initially, a concentrated salt solution, e.g., 30 percent water, is charged into an autoclave at 150°C. and 50 psig (3.5 kg./cm.$^2$) and heated with the vessel closed such that the temperature increases to about 195°C. and the pressure rises to 250 psig (17.6 kg./cm.$^2$). At this point a controlled vent valve in line 30 opens to maintain the pressure constant with continued heating such that the temperature rises to 243°C. and a major portion of the water boils off and is vented. This second stage requires the major portion of heat energy for the process. Most of the time for these two stages is needed to conduct heat from the vessel walls and any interior heating elements, e.g., Dowtherm heated coils, throughout the volume of the solution. In the next stage, the vent valve in line 30 is opened further and the pressure is gradually reduced in a controlled fashion to substantially atmospheric pressure. The temperature rises further, for example by about 20°C. The molecular weight rises significantly. The polymerization is completed at this temperature and pressure during which the time required is controlled primarily by reaction rate rather than by heat transfer. Finally, the molten polymer is extruded under pressure from the autoclave.

Since heat transfer is the major limiting factor during the first and second stages of polymerization, the overall polymerization time can be reduced significantly by more efficient heating. For this invention, virtually no heat transfer time factor is involved. By the appropriate electrode design, current can be made to flow throughout the volume of the reactant mixture in the autoclave, heating various differential volumes essentially simultaneously. Although some slight nonuniformity of current density may result and the degree of electric heating vary slightly over the volume, the heat transfer required to equilibrate these minor variations is significantly less than that required where the entire heat input is from heated surfaces of the vessel walls and interior heating elements.

By this invention, heat can be turned on or off instantaneously. Thus, the system is far more adaptable to automation such as direct digital control. Another advantage of the invention is that unlike heated autoclave walls and interior heating elements, the heating electrodes are never hotter than the reactants thus minimizing thermal degradation. Essentially, all electrical energy taken from the power line is converted to thermal energy in the solution, thus providing a very high degree of efficiency.

EXAMPLES

Employing the five stages of polymerization as described previously, polymers are prepared using a 500 lb. (227 kg.) capacity, jacketed, vapor heated, autoclave which has been modified by removal of an interior agitator and by insertion of electrodes for heating by this invention. The transformer 50 has multiple secondary arrangements but because of its power rating (350 kva), a complete batch could be run in the fashion illustrated in FIGS. 1 and 2 without changing configurations. The autoclave head is fabricated to provide electrical connections to the interior. A mineral-insulated cable manufactured by E. L. Weigand Company, Pittsburgh, Pennsylvania is employed. The cable 28 consists of a copper conductor, a stainless steel sheath and an intermediate insulating layer of magnesium oxide. Three leads and three electrodes are used, one connected to each phase of the power transformer 50. The autoclave wall is grounded such that the current flows through the solution from electrode-to-electrode and from each electrode to ground. Thus, the load is a combination Wye-Delta configuration with the autoclave wall acting as the grounded center of the Wye. The electrode support cylinder 42 is of stainless steel, plasma jet coated with aluminum oxide to provide electrode-to-electrode electrical insulation. Cycle times versus various power levels for five polymer batches are shown as items A – E in Table I. Each batch consists of a 50 percent 66-nylon salt solution containing 900 lbs. (1980 kg.) of salt. These cycle times (A – E) compare to a 10 batch average time (item F of Table I) of 100 minutes for the total first and second cycle times and 30 minutes fourth cycle time under essentially the same conditions except for the use of an agitator in place of the heating electrodes.

A time versus temperature plot for batch C shows the reactant temperature rises steadily to 243°C. in 36 minutes (end of second cycle) whereas for a Dowtherm heated batch the temperature flattens out at 216°C. after 25 minutes, and then proceeds to rise more slowly through the remainder of the second cycle.

Electrolysis of the solution resulting in the generation of hydrogen and oxygen gases is found to be no problem under the conditions employed. The oxygen evolved tends to react and degrade the resulting polymer, however, this is readily controlled by employing a conventional antioxidant such as manganous hypophosphite (200 parts/million). Well-known copper antioxidants for nylon are also effective.

The electrodes constructed of titanium are found to be free of any evidence of corrosion.

Electrical resistance of the reactant mixture is a function of temperature, degree of polymerization, water content and pressure. For batches run in a similar manner these factors are all related to temperature such that a resistance versus temperature curve provides data adequately for equipment design. Electrical data for batch C are shown in Table II.

TABLE II

| Mins. Since Start | I (Amps) | V (Volts) | POWER (kw) | R (ohms) | TEMP (°C) |
|---|---|---|---|---|---|
| 0 | 352 | 100 | 61 | 0.26 | 157 |
| 1 | 450 | 100 | 78 | 0.22 | 158 |
| 3 | 520 | 100 | 90 | 0.19 | 163 |
| 4 | 560 | 106 | 103 | 0.19 | 168 |
| 7 | 580 | 106 | 107 | 0.18 | 180 |
| 9 | 420 | 100 | 73 | 0.24 | 187 |
| 11 | 470 | 145 | 118 | 0.31 | 191 |
| 12 | 460 | 190 | 152 | 0.41 | 193 |
| 14 | 490 | 250 | 212 | 0.51 | 199 |
| 16 | 400 | 318 | 221 | 0.80 | 205 |
| 17 | 336 | 330 | 192 | 0.98 | 207 |
| 19 | 225 | 332 | 130 | 1.48 | 220 |
| 21 | 160 | 332 | 92 | 2.08 | 225 |
| 24 | 85 | 332 | 49 | 3.9 | 230 |
| 28 | 42 | 340 | 25 | 8.1 | 234 |
| 34 | 21 | 340 | 12.4 | 16.2 | 240 |
| 36 | 16 | 340 | 9.5 | 21.3 | 243 |
| 44 | 9 | 340 | 5.3 | 37.6 | 248 |
| 63 | 4.1 | 340 | 2.4 | 83 | 244 |
| 67 | 0.9 | 340 | 0.5 | 376 | 245 |
| 77 | Turned electrical power off | | | | 262 |
| 97 | Began to extrude | | | | |

TABLE I

| Batch | A | B | C | D | E[3] | F |
|---|---|---|---|---|---|---|
| 1st-2nd Cycle Time, mins. | 49 | 44 | 36 | 35 | 38 | 100 |
| 4th Cycle Time, mins. | 12 | 40 | 30 | 45 | 45 | 30 |
| Total KW-hr. | 42 | 48.5 | 59 | 55 | N.A. | N.A. |
| Max. Current, amp. | 400 | 480 | 580 | 550 | N.A. | N.A. |
| Max. Power, kw. | 140 | 184 | 221 | 240 | N.A. | N.A. |
| Average Dowtherm Pressure[4] psig | 24 | 17 | 14 | 35 | 35 | N.A. |
| kg./cm.[2] | 1.7 | 1.2 | 0.98 | 2.5 | 2.5 | N.A. |
| Relative Viscosity[1] | 22 | 32.8 | 29.4 | 30.1 | 33.3 | N.A. |
| Amine Ends[2] | 43 | N.A. | 33.4 | N.A. | 30.7 | N.A. |

N.A. - not available
[1]8.4% by weight solution in 90% formic acid
[2]Equivalents per million grams of polymer
[3]Contained 200 ppm manganous hypophosphite as antioxidant
[4]Heating of vessel walls only Resistance measurements for batch C show line-to-line resistance (line voltage divided by line current) ranging from 0.18 ohm near the start of the batch to 20 ohms at the end of the second stage venting. By the end of the polymerization the resistance rises to approximately 800 ohms. The cell constant of the clave with three electrodes is approximately 0.05 cm.$^{-1}$. Thus, the resistivity of the nylon reactants employed ranges from 7.2 ohm-cm. to 884 ohm-cm. through the first and second stages and reaches 32,000 ohm-cm. at the end of the polymerization. Thus, a power supply employed must be capable of matching the load resistance with this range. Since the resistance of the product will increase as water boils off and as the salt polymerizes, the power consumed will decrease and the system will have a degree of self-regulation because of this.

A potential problem of polymer coating the electrodes and solidifying upon addition of the salt solution for a following batch, thus providing insulation and preventing current flow, can be controlled either by passing a high current through the electrodes to heat and melt the polymer or by injecting steam into the autoclave to clean the walls and surfaces between batches.

With similar circuitry 6 or 12 electrodes can also be used if needed for more uniform heating. Heating between that supplied by the vessel walls and by the electrodes can be adjusted as desired for best operability.

What we claim is:

1. In a polymerization process including the steps of heating an aqueous mixture of a polyamide-forming salt of a diamine and dicarboxylic acid under polymerization temperature and pressure conditions, and venting steam generated in the process reaction, said mixture being electrically conductive and having an electrical resistance increasing with the degree of polymerization, the improvement comprising passing an electrical current of from 0.9 to 580 amps. through said mixture to generate heat for vaporizing the water in said aqueous mixture, said current decreasing as the water vaporizes and the salt polymerizes.

2. The process as defined in claim 1, said polyamide-forming salt being a salt of hexamethylene diamine and adipic acid.

* * * * *